United States Patent [19]
Tuckey

[11] Patent Number: 5,181,839
[45] Date of Patent: Jan. 26, 1993

[54] QUICK CONNECT FUEL PUMP ASSEMBLY
[75] Inventor: Charles H. Tuckey, Cass City, Mich.
[73] Assignee: Walbro Corporation, Cass City, Mich.
[21] Appl. No.: 819,346
[22] Filed: Jan. 9, 1992
[51] Int. Cl.⁵ .............................................. F04B 35/04
[52] U.S. Cl. ................................... 417/360; 285/316; 417/423.3
[58] Field of Search ................ 417/360, 423.3, 423.15; 285/110, 316

[56]  References Cited
U.S. PATENT DOCUMENTS

| | | | |
|---|---|---|---|
| 2,558,695 | 6/1951 | Unger | 285/110 |
| 2,914,345 | 11/1959 | Osborn | 285/110 |
| 2,950,129 | 8/1960 | Schaefer | 417/423.15 |
| 4,591,319 | 5/1986 | Takahashi et al. | 417/360 |
| 4,614,371 | 9/1986 | Bauder | 285/110 |
| 4,795,320 | 1/1989 | Tuckey | 417/360 |

Primary Examiner—Richard A. Bertsch
Assistant Examiner—Charles G. Freay
Attorney, Agent, or Firm—Barnes, Kisselle, Raisch, Choate, Whittemore & Hulbert

[57]  ABSTRACT

A quick connect assembly for a fuel pump outlet line and a fuel tank line outlet with a flexible grommet received in a housing connected to one of the lines. The other line is received in a central hole through the grommet. A cover overlies the grommet and is urged onto the housing by a compression spring. In use, pressurized fuel is received in an annular groove in the grommet and urges it into sealing engagement with both the line received therein and the housing.

9 Claims, 1 Drawing Sheet

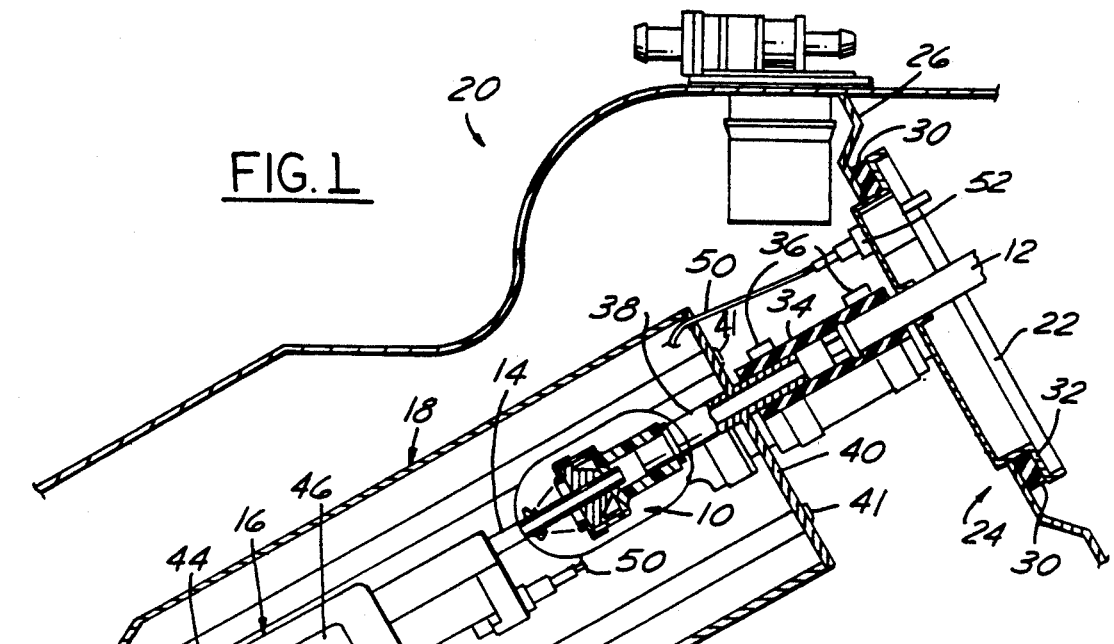
FIG. 1
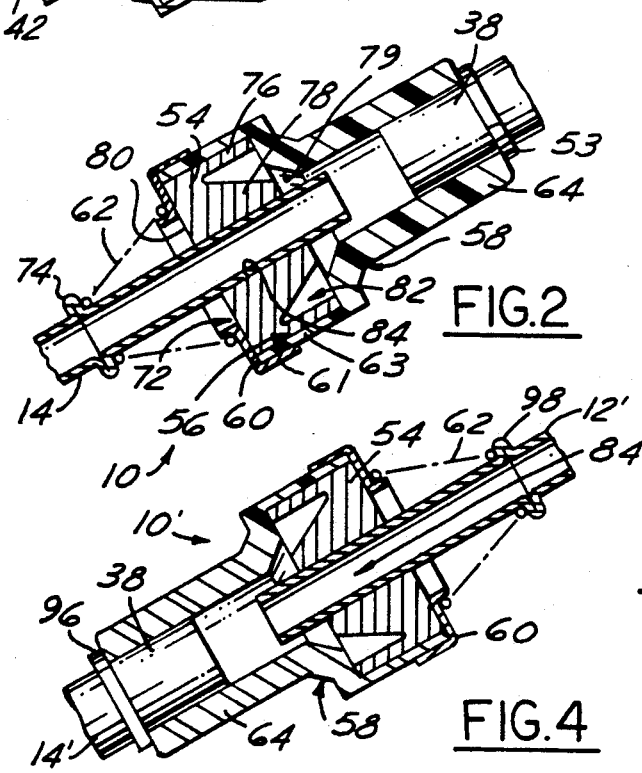
FIG. 2
FIG. 4
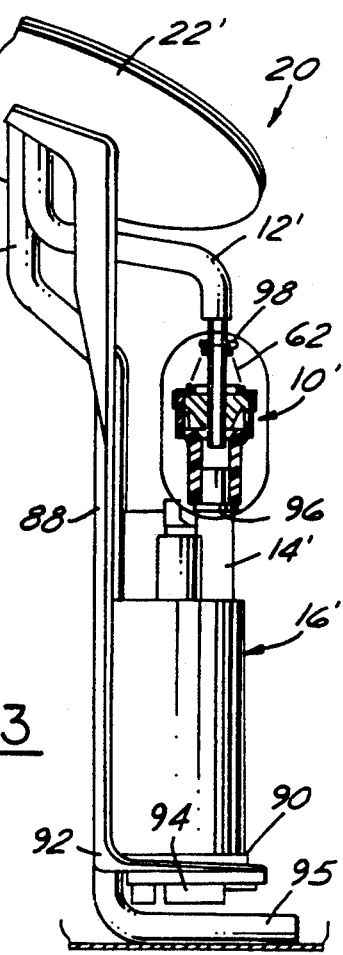
FIG. 3

QUICK CONNECT FUEL PUMP ASSEMBLY

FIELD OF THE INVENTION

This invention relates to fuel pumps and more particularly to a fuel line connector.

BACKGROUND

Electrically driven fuel pumps mounted in fuel tanks are commonly used in motor vehicles. The fuel pump is installed in the tank through an access opening and positioned below a closure cover secured to the top of the tank. Within the tank, the pump is connected to a fuel line which passes out of the tank through the cover and is connected to the carburetor or fuel injection system of the engine. Typically, the pump and an electric drive motor are mounted in a housing which is frequently received in a drop-in canister carried by the closure cover. Alternatively, the pump and motor housing is carried by a mounting bracket fixed to the closure cover.

This inventor's prior U.S. Pat. No. 4,795,320 describes a "quick disconnect pulse modulation sleeve" where similar results to the present invention are achieved, albeit at greater cost, with a greater number of parts and increased assembly time, and with a decreased ability to reduce noise transmission.

SUMMARY

Pursuant to this invention, a fuel pump outlet line and fuel line are releasably coupled together by a quick connect assembly having a grommet of a resilient material with a central passage through which one of the lines is received and an annular groove encircling the central passage and defining in part a circumferentially continuous peripheral wall providing a sealing lip. The grommet is received in a housing which is connected to the other line and has a central passage communicating with both lines and the groove and lip of the grommet.

In use, pressurized fuel urges the grommet into firm sealing engagement with both the first line and the housing. Preferably the central portion of the grommet is conical and the grommet is held in the housing by a cover yieldably urged onto the housing by a conical shaped coil spring.

Objects, features and advantages of this invention are to provide a quick connect assembly which substantially reduces noise transmission, is quickly and easily assembled, reduces the number of parts and assembly time of the fuel pump assembly, and is rugged, durable and of economical manufacture and assembly.

BRIEF DESCRIPTION OF THE DRAWINGS

These and other objects, features and advantages of this invention will be apparent from the following detailed description, claims and accompanying drawings in which:

FIG. 1 is a vertical section of a fuel tank canister and pump assembly with a connector of the present invention shown in section disposed in the canister.

FIG. 2 is an enlarged sectional view of the connector of the present invention as shown encircled in FIG. 1.

FIG. 3 is a side view of another fuel tank pump assembly with the connector of the present invention shown in section.

FIG. 4 is an enlarged sectional view of the connector of the present invention as shown encircled in FIG. 3.

DETAILED DESCRIPTION OF THE INVENTION

Referring in more detail to the drawings, FIG. 1 illustrates a quick connector 10 embodying this invention coupling an outlet fuel line 12 to the outlet tube 14 of a fuel pump assembly 16. The connector and pump assemblies are received in a canister 18 disposed in a fuel tank 20. The canister is carried by a cover 22 disposed in an access opening 24 in a top wall 26 of fuel tank 20. An annular seal 30 is disposed between a flange 32 of the cover and the periphery of the access opening 24.

The outlet fuel line 12 is a rigid tube which passes through the cover, is fixed and sealed to it, and is connected by a flexible hose 34 and clamps 36 to a nipple 38 fixed and sealed to a top 40 secured by the rods and screws 41 to the body of the canister. The other end of the nipple 38 is connected to the pump outlet tube 14 by the connector 10. The pump assembly 16 has a rigid outlet tube 14 projecting from one end and a rigid inlet tube 42 projecting from the other end, which are connected to the outlet and inlet respectively of a fuel pump 44 driven by an electric motor 46. The pump and motor are mounted in the housing 16. An electric current is supplied to the motor through an insulated and flexible wire 50 attached to a suitable connector 52 mounted on the cover 22. The pump assembly 16 is suspended in the canister 18 by the quick connector 10 coupling the pump outlet tube 14 with the nipple 38 of the canister.

As shown in FIG. 2, in accordance with the invention, the connector 10 has a grommet 54 received in an annular cavity 56 in a housing 58 and releasably retained therein by the cooperation of a cover 60 and a compression spring 62. The housing 58 forms the annular cavity 56 preferably with a circumferentially continuous wall portion 63 proportioned to slidably receive the grommet 54. The housing 58 extends at one end to form a hollow tube 64, communicating with the annular cavity 56. The hollow tube 64 frictionably and sealingly receives an end of the nipple 38 with an abutment flange 53 bearing on the housing.

The cover 60 has an annular side wall 61 slidably received over housing 58 and yieldably retained, by a compression spring 62 encircling the pump outlet tube 14 and bearing on the cover 60 and a flange 74 in the tube. Preferably the spring 62 is a conical coil spring. To prevent contact between the tube 14 and the cover 60, it has an enlarged clearance hole 72 with a lip for retaining the base of the spring 62.

The grommet 54 has a relatively thin and circumferentially continuous outer wall portion 76 encircling a generally conical central portion 78 and a generally flat and closed end 80. An annular groove 82 formed between the outer wall portion 76 and the central portion 78 communicates with the hollow tube 64 through the conical passage 79. A central opening 84 extends through the grommet 54 to slidably receive and seal the tube 14 so that it communicates with the interior of the housing 58. Pressurized fuel in the annular groove 82 preferably assists in sealing the grommet outer wall portion 76 to the housing wall portion 63, and in sealing the grommet central portion 78 to the fuel line 14.

Typically, the connector 10 is installed in the canister 18 and connected to the pump housing 16 by first subassembling the components of the connector. The grommet 54 is disposed in the cavity 56 in the housing 58. The housing 58 is then connected to the nipple 38 by forcing the tubular portion 64 over the end of the nipple and into engagement with its flange 53. Preferably, the cover 60 is disposed on the housing and the base of the compression spring 62 is disposed on the cover so that it encircles and preferably frictionally engages the lip of the cover. Both the spring 62 and the connector 58 are then inserted over the free end of the pump outlet tube 14 so that it is frictionally and sealingly received in the grommet 54 and the other end of the spring bears on the flange 74 of the tube. The cover 40 is then attached to the canister 18 by the tie rods and screws 41. Normal manufacturing and assembly tolerances and variations in the axial position of the connector 10 relative to the pump assembly 16 are accommodated by the telescoping assembly of the compression spring 62 and grommet 54 over the pump outlet tube 14.

The canister assembly 18 is then connected to the cover plate 22 by inserting the other end of the nipple 38 and the fuel outlet tube 12 into the opposed ends of the hose 34 and securing the clamps 36. The electric wire 50 is also connected to the connector 52. Thereafter, this assembly of the canister 18 and cover 22 is mounted in the gas tank 20 by inserting the canister through the tank access opening 24 and securing the cover 22 to the tank with the seal 30 disposed between them.

FIGS. 3 and 4 illustrate a modified fuel tank assembly with a fuel pump and motor assembly 16' carried by a mounting bracket 88 fixed to a fuel tank closure cover 22'. The bottom 90 of the fuel pump assembly 16' is removably received in a flanged cup 92 of the bracket 88 which has a central hole through which the inlet tube 94 of the fuel pump projects. Preferably, a fuel recirculation return line 95 is also carried by the cover 22'.

The pump assembly 16' is retained on the bracket 88 and connected to the outlet fuel line 12' by the quick connector 10' of this invention. As shown in FIGS. 3 and 4, in this embodiment, orientation of the connector 10' is reversed compared to the orientation of the connector in the embodiment of FIGS. 1 and 2. The tube 64 of the connector 10' is frictionally and sealingly received over the end of the pump outlet tube 14' and bears on a flange 96 thereof. The grommet 54 and spring 62 of the connector 10' are telescoped over the free end of the fuel tank outlet tube 12' with the distal end of the spring bearing on a flange 98 of the tube and the grommet in sealing engagement with the tube.

Typically, the grommet 54, housing 58 and cover 60 of the connector 10' are first assembled together and then the tubular portion 64 is forced over the tube 14' of the pump assembly 16'. Preferably, the spring 62 is then disposed on the cover 60 with its base engaging the lip of the cover. The compression spring 62 and the grommet 54 are then telescoped over the tank outlet tube 12' and the bottom 90 of the pump assembly 16' is disposed in the cup 92 of the bracket 88. The bottom 90 of the pump assembly 16' is yieldably urged into the cup 92 of the bracket 88 by the spring 62 which bears on the flange 98 of the tank outlet tube 12' and the cover 60 of the connector 10'.

Both embodiments of the quick connector 10 and 10' substantially reduce the transmission of the noise produced in the operation of the pump by providing a resilient connection between the pump and the outlet tube of the fuel tank. The connector also facilitates rapid and easy mounting of the fuel pump and connection with the outlet tube of the tank. The connector accommodates substantial variation in manufacturing and assembly tolerances and yieldably biases its components into assembled relationship and biases the pump and motor assembly into its mounted relationship in the canister or on a carrier bracket. The connector also reduces the number of parts to be assembled, decreases assembly time, and is rugged, durable and of economical manufacture and assembly.

I claim:

1. A quick connect assembly for connecting a fuel pump outlet line to a fuel supply line which comprises: a housing having a circumferentially continuous recess therein for receiving a grommet and a passage communicating with said recess and the exterior of said housing and constructed and arranged to receive a first line and communicate such first line with said recess, a grommet received in said recess, said grommet being of one piece of a flexible and resilient material and having a central portion with a through passage constructed and arranged to slidably receive a second line in sealing engagement therewith and to communicate such second line with said passage in said housing, a circumferentially continuous outer wall portion integral with and encircling said central portion and constructed and arranged for sealing engagement with said housing when received in said recess thereof, said recess for the grommet opens to the exterior of said housing, a cover overlying the opening of said recess and removably received on said housing, a clearance hole through said cover for passage of the second line into the grommet through said cover, and said grommet having an annular groove between said outer wall portion and said central portion constructed and arranged to communicate with said passage through said recess so that pressurized fuel in said assembly urges said outer wall portion of said grommet into sealing engagement with said housing and said central portion into sealing engagement with such second line when received therein.

2. The quick connect assembly of claim 3 wherein the central portion of the grommet is of generally conical shape.

3. The quick connect assembly of claim 1 which also comprises a spring bearing on said cover and urging said cover onto said housing.

4. The quick connect assembly of claim 3 wherein said spring is a conically-shaped coil received between a flange on the second fuel line and said cover and encircling the second fuel line.

5. The quick connect assembly of claim 1 wherein the annular groove in the grommet receives pressurized fuel which urges a lip of the grommet outer wall portion into sealing engagement with a circumferentially continuous walled portion of said recess in said housing.

6. The quick connect assembly of claim 1 wherein the annular groove in the grommet receives pressurized fuel as it communicates with the passage connected with the recess receiving the grommet, which urges the central portion of the grommet into sealing engagement with the second fuel line when received therein.

7. The quick connect assembly of claim 1 wherein the grommet is constructed and arranged to isolate the second fuel line from direct contact with the housing and the first fuel line and permits limited relative movement between the first and second fuel lines, whereby the quick connect assembly provides vibration isolation between the first fuel line and second fuel line through use of the flexible and resilient grommet material.

8. The quick connect assembly of claim 1 which also comprises, a canister, said fuel pump assembly and quick connect assembly are contained within said canister, and said canister is mounted inside a fuel tank.

9. The quick connect assembly of claim 1 which also comprises a bracket supported from a fuel tank closure cover mounted inside a fuel tank, and said fuel pump assembly and quick connect assembly are carried by said bracket.

* * * * *

UNITED STATES PATENT AND TRADEMARK OFFICE
CERTIFICATE OF CORRECTION

PATENT NO. : 5,181,839
DATED : January 26, 1993
INVENTOR(S) : Charles H. Tuckey

It is certified that error appears in the above-indentified patent and that said Letters Patent is hereby corrected as shown below:

Col. 4, Line 33, change "claim 3" to -- claim 1 --.

Signed and Sealed this

Fourth Day of January, 1994

Attest:

BRUCE LEHMAN

*Attesting Officer*     *Commissioner of Patents and Trademarks*